March 10, 1936.

F. W. BURGER

Re. 19,885

DUAL WHEEL

Original Filed May 19, 1930 3 Sheets-Sheet 1

Witnesses:
Harry R. L. White.
Robert Cremer

Inventor:
Frederich W. Burger
By Brown, Jackson, Boettcher & Dienner
Attys.

March 10, 1936.

F. W. BURGER

Re. 19,885

DUAL WHEEL

Original Filed May 19, 1930 3 Sheets-Sheet 2

Witnesses:
Harry R. L. White.
Robert Cremer

Inventor:
Frederick W. Burger.
By Brown, Jackson, Boettcher & Dienner
Attys.

March 10, 1936.

F. W. BURGER

Re. 19,885

DUAL WHEEL

Original Filed May 19, 1930 3 Sheets-Sheet 3

Witnesses:
Harry A. D. White
Robert Cremer

Inventor:
Frederick W. Burger
By Brown, Jackson, Boettcher & Dienner
Attys

Reissued Mar. 10, 1936

Re. 19,885

UNITED STATES PATENT OFFICE 19,885

DUAL WHEEL

Frederick W. Burger, Niles, Mich., assignor to Clark Equipment Company, Buchanan, Mich., a corporation of Michigan Original No. 1,948,614, dated February 27, 1934, Serial No. 453,662, May 19, 1930. Application for reissue March 23, 1934, Serial No. 717,116

37 Claims. (Cl. 301—12)

This invention relates to dual wheels and has for its principal object the production of a new and improved wheel of this type.

In heavy duty automotive vehicles such as trucks, buses, and the like, it is customary to mount two pneumatic tires on each of the rear wheels of the vehicle to thereby distribute the weight placed on those wheels by the vehicle over a larger area of pavement, to secure greater tractive effort and to minimize the wear and tear on both the vehicle and pavement.

In the employment of a rear wheel of this type, certain advantages are gained through the use of a felloeless wheel on which the tire carrying rims are mounted by engagement directly with the ends of the spokes of the wheel. In my prior Patent No. 1,829,889, issued November 3, 1931, I disclose a wheel of this type in which the tire carrying rims are attached to the spoke ends by clamping lugs and spacing rings which engage the gutter of the rim. The present invention may be considered as an improvement in a wheel of the type disclosed in my prior patent, the particular improvements specifically relating to improvements in the mounting and centering of the rim upon spoke ends as will presently appear.

In a wheel in which the tire carrying rim is clamped by means of its gutter, considerable difficulty has been experienced heretofore in providing an adequate arrangement for transmitting the driving thrust from the spokes to the rim, and I have therefore as an additional object of my invention provided an arrangement whereby the driving thrust from the spoke is definitely and positively transmitted to the rim without danger of the rim sliding on the wheel or being dislodged therefrom.

In the employment of dual wheels it is necessary that the individual tire carrying rim be accurately aligned on the wheel so that they will run true when the wheel is in service and the wear on the tire will thereby be reduced to a minimum. This alignment includes alignment of the rim in and out of the plane of the wheel and also alignment to bring the center of the rim exactly coincident with the center of the wheel so that the load imposed upon the tires will be equal in all instances. I have therefore as an additional object of my invention provided a new and improved clamping lug which by cooperating with the spacing ring and tire carrying rims of the wheel centers the tire carrying rim on the wheel in all directions.

Now to acquaint those skilled in the art in the teaching of my invention, reference is made to the accompanying drawings in which a preferred embodiment of it is shown by way of example, and in which.

Figure 1:
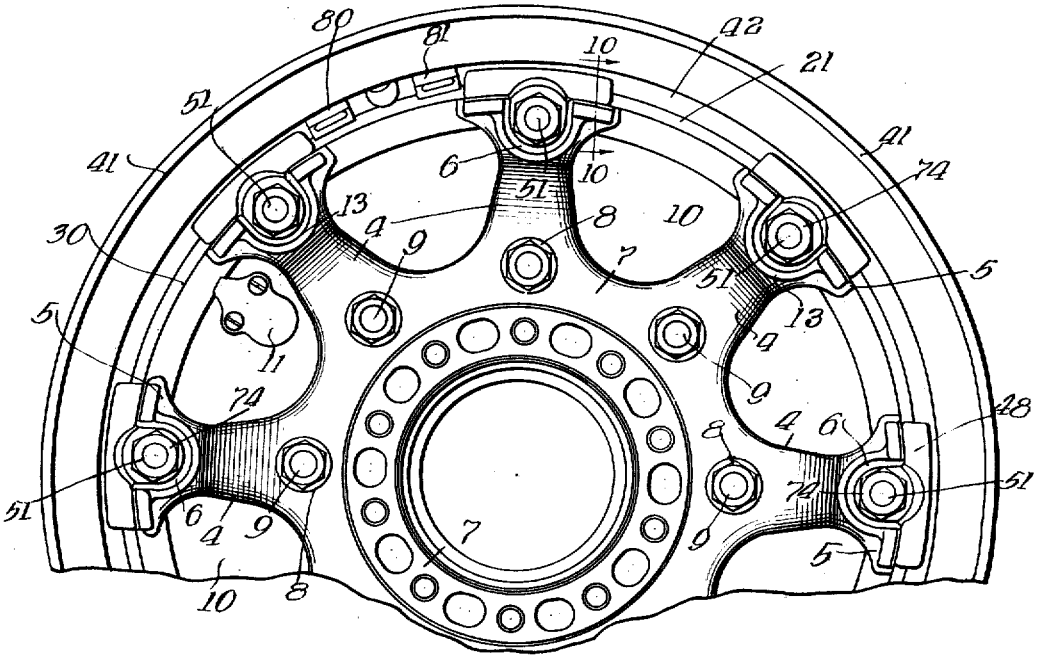
Figure 1 is an elevational view of a wheel embodying the teachings of my invention.
Figure 2:
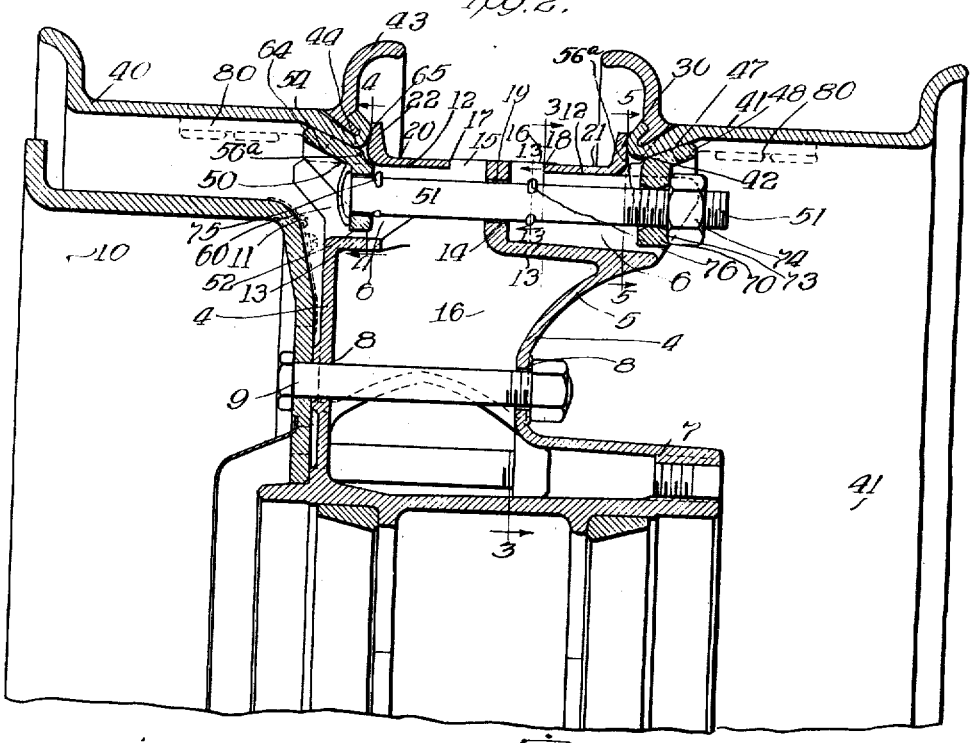
Figure 2 is a cross sectional view through one of the spokes of the wheel shown in Figure 1 showing the details of the gutter clamping arrangements.

Referring now to the drawings in more detail, Figure 1 shows a spider or wheel body which is preferably cast in one piece and comprises a central portion or hub 7 with spokes 4 radiating therefrom. These spokes 4 are preferably cast integrally with the hub 7 but it is to be understood that any assembled spider wheel can be substituted within the teachings of my invention. The spokes are preferably made hollow to reduce the weight of the wheel as much as possible, and are of generallly cylindrical shape as best shown at 16, Figure 2. A brake drum 10 is secured to the inboard side of the spider by means of bolts 9 passing through holes 8 in the spokes. A sight opening in the brake drum at a convenient point is covered by the plate 11, by removal of this plate the condition of the brake bands can be ascertained without the removal of the whole wheel.

The radially outward end of the walls of the spoke 4 are flared in a circumferential direction, as at 5, in the plane of the wheel to form inboard and outboard ledges or seats 12 which are disposed transversely of the plane of the spider and on opposite sides of the spokes. A semi-cylindrical wall 13 disposed between the ledges 12 partially closes the outer end of the spoke 4 and forms with the walls of the ledges 12 a transversely disposed socket 6 in the end of the spoke. A radial wall 14 disposed on the meridian line of the spoke in the plane of the spider divides this socket into two portions. This wall 14 extends radially outwardly beyond the outer surfaces of the ledges 12, which ledges are raised as at 15 and 16 into the plane of the end of the wall 14 to form shoulders or abutments 17 and 18 adjacent the wall 14. The wall 14 is provided with an opening 19 through which a through bolt is projected as will presently appear.

The ledges 12 serve as supports for the spacing rings, the inboard ring being designated by the reference numeral 20 while the outboard ring is designated by the reference numeral 21. These rings are, however, preferably although not necessarily identical and both have their adjacent edges abutting against the shoulders 17 and 18 to definitely locate the rims transversely of the spoke and to align each in a plane parallel to the plane of the spider.

Figure 3:
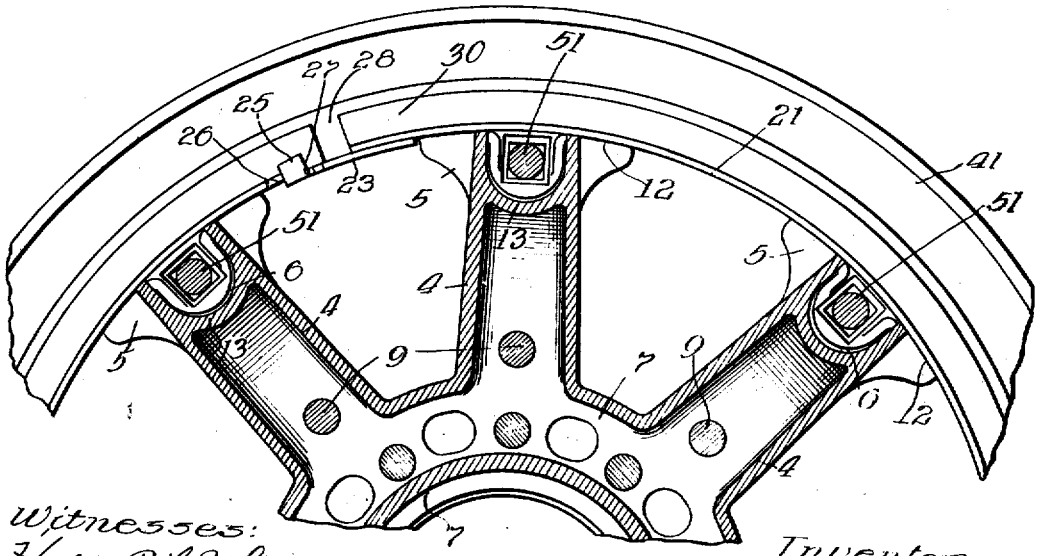
Figure 3 is a detail view partly in section taken along the line 3—3 of Figure 2.
Figure 14:
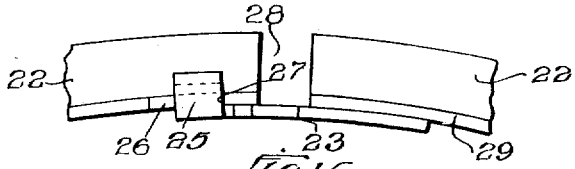
Figure 14 is an elevational view of the spacing ring taken from the interior as it is assembled on the spider.
Figure 15:
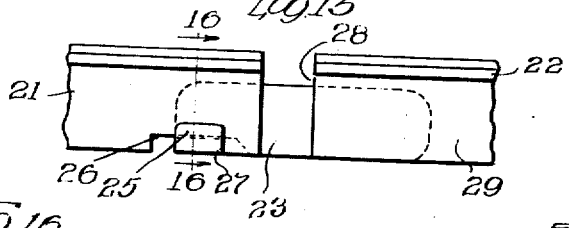
Figure 15 is a top plan view of the spacing ring as seen in Figure 14.
Figure 16:
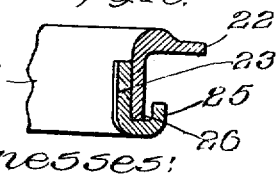
Figure 16 is a cross-sectional view taken along the line 16—16 of Figure 15 looking in the direction of the arrows.
Figure 17:
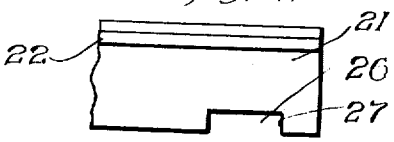
Figure 17 is a plan view of one end of the spacing ring formed to accommodate the latch member.
Figure 4:
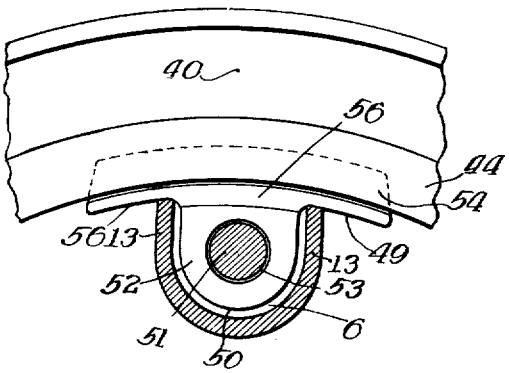
Figure 4 is a cross sectional view taken along the line 4—4 of Figure 2 looking in the direction of the arrows.
Figure 5:
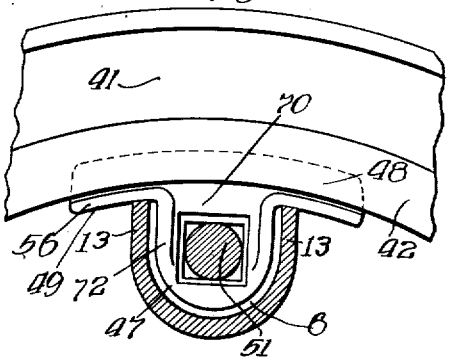
Figure 5 is also a cross sectional view taken along the line 5—5 of Figure 2 looking in the direction of the arrows.
Figure 6:
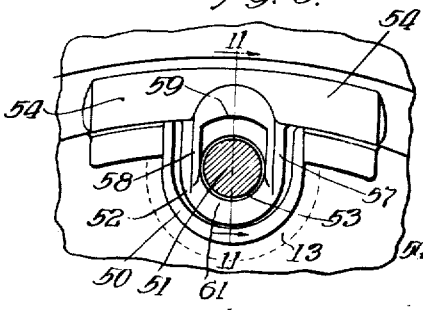
Figure 6 is a fragmentary view of the wheel showing the details of the inboard clamping lug.
Figure 7:
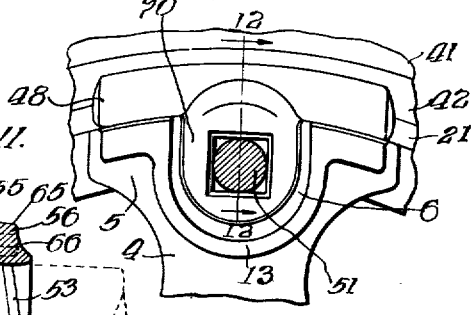
Figure 7 is a fragmentary elevational view showing the outboard clamping lug.

The ring 20 consists of a flanged split ring, the flange portion 22 projecting outward radially from the plane portion 29 of the ring to form an abutment against which the gutter of the inboard tire carrying rim abuts as will presently appear. The ring 20 is split at 28, see Figures 14 and 15, so that it may be slipped onto the wheel over the shoulders 17 and 18 and the projecting end of the wall 14 to position on the rear side of the shoulder 17. To guard against the possibility of the rings 20 and 21 splitting or spreading under the tension placed on them by the clamping lugs which grip the tire carrying rims, I have provided latches 23 riveted or welded to one end of each of the spacing rings 20—21. The free ends of each of these latches are provided with portions 25 which are bent over to form U-shaped flanges. The opposite ends of each of these rings 20—21 are provided with laterally disposed slots 26 which form shoulders 27 against which the projections of the latches abut to hold the ends of the rings together. The latches are located on one side of the circular portion of the rings 20—21 and the projections 25 extend through the slots and over the opposite sides of these portions of the rings, thereby securely binding the free ends of the rings together. The latches 23 also abut the flared portions of the adjacent spoke and thereby prevent circumferential movement thereof relative to the wheel body, as best shown in Figure 3.

The tire carrying rims 40 and 41 may be of any preferred type of rim provided with radially inwardly projecting gutters 44 and 42, respectively, but I may use a plain rim having an angular portion secured to its inner margin to produce the clamping surface equivalent to the gutter type rim. In the embodiment disclosed, I have shown the gutter type rims 40—41 having removable side members 43 which are lodged in the gutter portions 42—44. These side portions 43 are split to facilitate removal thereof. The inside diameter of the gutter is slightly greater than the outside diameter of the portions 15 and 16 of the spoke, so that the rim 40 is free to pass over these portions in moving from the outboard side of the wheel into its position on the inboard side of the spider.

The rim 40 is held in this position by means of clamping lugs 50 disposed against the gutter 44 and on the ends of through bolts 51 which extend through the openings 19 in the separating wall 14 in the spoke end, the threaded end of this bolt projecting through the socket 6 formed by walls 12 and 13 to receive similar clamping lugs 47 which are employed to hold the outboard rim 41 in place on the wheel.

As will be seen from Figures 4, 6, 8, and 11, the laterally inner clamping lug 50 comprises a shank 52 containing a central hole 53 through which the bolt 51 is passed and an integral wedge member 54 centered on the shank with respect to the center line of the shank and hole 53. The clamping or wedge surface 55 of the wedge member is shaped as a section of a cone, and at one end of this section is formed a cylindrical section or tang, 56. The wedge member 54 is offset radially outwardly from the shank 52 to permit greater movement of the clamping lug 50 and the bolt 51 laterally of the spider and between it and the brake drum 10 of the wheel. Vanes 57 and 58 are disposed on either side of the bolt hole 53 connecting the shank 52 to the wedge member 54, and these vanes together forming a socket 59 into which the head 60 of the bolt 51 is seated to prevent its turning. The head 60 of the bolt 51 bears against the planar portion 61 of the clamping lug to transmit stress from the bolt to the lug.

The clamping lug 50 rests upon the ledges or seats 12 of the spoke with the shank 52 projecting down into the transverse socket 6 formed in the spoke end by the semi-cylindrical wall 13. By this arrangement movement of the lug about the axis of the bolt 51 is definitely prevented.

Figure 11:
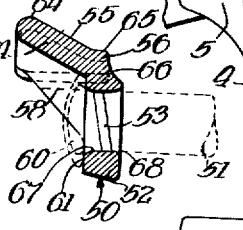
Figure 11 is a cross sectional view taken along the line 11—11 of Figure 6 looking in the direction of the arrows.
Figure 8:
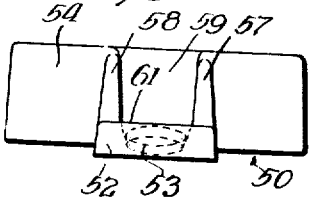
Figure 8 is a plan view of the clamping lug shown in Figure 6 taken from the bottom side thereof.
Figure 9:
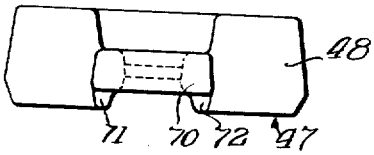
Figure 9 is a plan view of the clamping lug shown in Figure 7 taken from the bottom thereof.

The tang 56 serves the double purpose of centering the rim 40 on the spider and of preventing rotation of the clamping lug 50 about an axis normal to the axis of the bolt 51 as the bolt is being drawn to clamp the rim on the wheel. If, for example, the sloping surface 55 of the clamping lug contacts the rim at its tip point 64 to form a fulcrum at that point, the tendency of the lug to rotate in a counterclockwise direction about this fulcrum, Figure 11, is resisted by the contact of the point 65 of the tang 56 on the inside surface of the rim 40 with which it is in engagement. Similarly if the gutter 44 contacts the surface 55 at any other point on that surface, counterclockwise rotation of the clamping lug about that point as a fulcrum will be resisted by the engagement of the tang with the inner surface of the rim 40. Since the ends of the spacing rings are brought together as has been hereinbefore pointed out, that ring cannot spread and it can therefore successfully resist the outward pressure placed on it by the tang 56.

Obviously if the clamping lug 50 is drawn too far into the spoke end the distance of its outer face 55 from the axis of the wheel will be more than half of the diameter of the gutter and the rim will therefore be eccentric to the wheel. Eccentricity of the rim 40 with respect to the wheel causes the tire carried by that rim to assume more than its fair share of the load on the wheel with the result that the tire will wear at its high spot, and moreover the effective traction area of the wheel will be reduced because of the unequal distribution of the weight of the tire.

The tang 56 limits the amount of eccentricity of the rim with respect to the wheel by engaging the inner surface of the flange 22 of the spacing ring 20, thereby definitely limiting the innermost lateral position of the clamping lug 50 with respect to the spoke end and wheel. The end of the shank 52 is cut away concavely at 66 so that it will not interfere with the engagement of the tang 56 with the ring 20.

The hole 53 in the shank 52 is tapered at its opposite sides 67 and 68 so that when the bolt 51 is loosened to permit backing off the clamping lug 50 away from the rim, the lug may rotate slightly on the end of the bolt, this rotation facilitating removal and replacing of the rim on the end of the bolt.

As will be seen in Figures 5, 7, 9, and 12, the clamping lug 47 is of similar construction to the clamping lug 50 differing therefrom principally in that the shank 70 is moved laterally outwardly towards the center of the wedge member 48, this being possible since the lug 47 has plenty of room for movement longitudinally of the bolt when the nut thereon is loosened. The vanes 71 and 72 which projects from the shank 70 to the wedge member 48 are disposed on the back or laterally inward surface of the shank so that the laterally outward surface 73 is flat to receive the nut 74 by which the lugs are clamped against the rim on the wheel. The shoulders of the wedge member 48 abut against the outer ends of the spoke walls 12 to prevent rotation of the lug about the longitudinal axis of the bolt. The lug 50 is provided with tang means 56a identical in function with the tang 56 on the lug 50.

The clamping lug 50 is not removed from the bolt after it has been once assembled thereon, being held in place against the head of the bolt by a suitable clamping member or pin such as a cotter pin 75 projecting through the bolt. Similarly a cotter pin 76 is projected through the bolt adjacent the wall 14, so that the bolt cannot be removed from the spoke even though the nut 74 is removed. The outer clamping lug 47 is of course removable to permit fitting the rim 41 onto the wheel.

Figure 10:
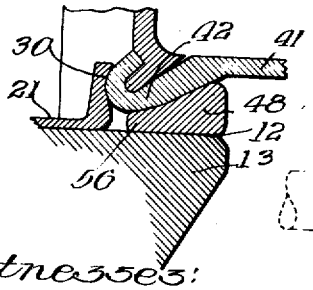
Figure 10 is a cross sectional view through the clamping lug taken along the line 10—10 of Figure 1 looking in the direction of the arrows.
Figure 12:
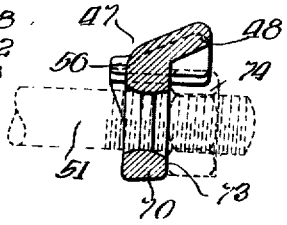
Figure 12 is a similar cross-sectional view taken along the line 12—12 of Figure 7 looking in the direction of the arrows.
Figure 13:
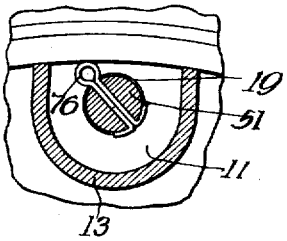
Figure 13 is a cross-sectional view taken along the line 13—13 of Figure 2 looking in the direction of the arrows and showing the end of the socket and cotter pin.

As will be seen in Figure 10, when the clamping lugs 47 and 50 are drawn up tight to wedge the gutter 42 of the rim 41 against the flange 30 of the spacing ring 21, thrusts placed on the rim 41 radially of it are transmitted to the wedge member 48 of the clamping lug and then to the side walls 12 of the spoke end, this arrangement securely holding the rim on the wheel and directly transmitting the thrust placed upon it to the central or spoke portion of the wheel. In order to prevent movement of the rim concentric to the axis of the wheel, I have provided abutment plates 80 and 81 on each of the rims 40 and 41, these abutment plates being attached to the rim in any convenient manner as by riveting or welding. When the rim is in place on the wheel the plates 80 and 81 are disposed between adjacent clamping lugs 47 and 50, the adjacent edges of the abutment plates striking against the ends of the wedge portions of the clamping lugs. By this arrangement, driving thrust is transmitted from the spoke of the wheel to the rim through the clamping lug, the shanks of the lugs abutting against the inside surface of the side walls 12 of the spoke to transmit this thrust without placing a great strain upon the through bolt by which the lugs are clamped to the wheel. By this arrangement, movement of the rim around the axis of the wheel is definitely prevented and the possibility of damage to the air valve is thereby eliminated. Obviously if desired, a plurality of sets of thrust plates 80—81 may be attached to the inner side of the rim and brought into registration with the clamping lugs, however I have found that a single pair of such lugs placed on opposite sides of the holes of each rim through which the valve stems project is sufficient to securely hold the rims against turning upon the wheel and to transmit driving thrust to them.

From the foregoing it is apparent that the wheel built in accordance with my invention is light and strong, and that the rear tire carrying rims are rigidly secured to the spoke ends and definitely alined both concentrically with the axis of the wheel and in planes parallel to the plane of the wheel so that the load on the tires is equalized and wear thereby minimized. Obviously the specific details are shown by way of example and may be modified within the teachings of my invention as will be apparent by one skilled in the art and I am not to be limited by these details but rather only by the scope of the appended claims.

What is claimed is:

1. The combination with a dual rimmed wheel having rims and a spider including a hub and spokes radiating therefrom, said spokes being provided with abutment means thereon, of split spacing rings removably mounted on the ends of the spokes and adapted to be disposed on opposite sides of said abutment means and to abut against the adjacent margins of said rim, and means on the edge of each of said split spacing rings to lock their ends together and adapted to engage a spoke end to prevent circumferential movement thereof relative to said wheel spider.

2. In a vehicle wheel of the class described comprising a wheel body carrying relatively fixed abutment means thereon, a clamping lug including a body portion adapted to have a bolt passed therethrough and an angular portion acting to clamp the rim on the wheel when the bolt is tightened, said angular portion adapted to be wedged between the rim and said wheel, and stop means on said angular portion disposed radially inwardly of the rim clamping section thereof and engageable with said rims for governing the initial position thereof, said stop means being engageable with said abutment means for governing the wedging action of the angular member when said bolt is tightened.

3. In combination with a dual wheel having a hub and spokes radiating therefrom, spacing rings comprising hoops having flanged side walls, inboard and outboard ledges formed on the spoke ends, said spacing rings being broken to facilitate mounting on said ledges, latching means on said spacing rings to hold the ends thereof from separating, rims mounted on the wheel and abutting said spacing rings, clamping lugs adapted to be moved together by means of bolts and to wedge the rims against the flanged portion of said rings and to wedge the rings against said ledges, and tangs on said lugs engageable with said rings and acting to prevent unequal tightening of the rims on the spokes.

4. A dual wheel comprising a spider having a hub and spokes radiating therefrom, said spokes having ledges at their outer ends laterally separated by radial ribs projecting outwardly beyond the surface of said ledges, a pair of spacing rings mounted on said ledges, one of said spacing rings being broken to expedite mounting over said ribs and on the inboard ledge, a latch on the ends of said broken spacing ring to hold the same against spreading relative to the ledge and ribs, the other of said spacing rings being mounted on the outboard ledge of said spider, said spacing rings forming abutments against which the adjacent margins of said rims bear, separate wedging lugs mounted on the spokes at opposite sides thereof and having wedging engagement with the adjacent margins of said rims, bolts for drawing said wedge lugs together to clamp said rims against said spacing rings and the spacing rings against said ribs, and inwardly extending tangs on the wedging portions of said lugs engageable with portions of said spacing rings for limiting the inward movement of the lugs.

5. A clamping lug comprising an arcuate wedge having one surface in the form of a section of a cone and the other surface in the form of a section of a cylinder, whereby one edge of the wedge is thinner than the other edge, said surfaces terminating laterally of the lug to form a pair of seating sections, and a shank projecting from the cylindrical surface between said seating sections adjacent the thinner edge thereof and at a direction normal thereto.

6. A clamping lug comprising an arcuate wedge having a conical outer surface and a cylindrical inner surface providing a thin edge at one side and a thick edge at the other, said surfaces terminating laterally of the lug to form a pair of seating sections, a shank projecting from said thin edge and disposed laterally inwardly of the major portion of said cylindrical surface between said seating sections, said shank having an opening therein to receive a clamping bolt, and an arcuate recess formed in the thick edge of said wedge to so dispose the clamping bolt that the clamping force can be applied at the laterally inner portion of said cylindrical surface closely adjacent the thin edge of the lug.

7. A spacing ring for dual wheels comprising a hoop containing a radial flange, the hoop and flange being cut radially to split them, there being a slot in the edge of the hoop adjacent one of its ends, and a latch on the hoop adjacent its other end, said latch having a radially extending tongue disposed in said slot to lock the ends of the ring together.

8. A spacing ring for dual wheels comprising a hoop containing a radial flange, the hoop and flange being cut radially to split them, there being a slot in the edge of the hoop adjacent one of its ends, a latch on the hoop adjacent its other end on the radially inside face of the hoop, and a tongue on said latch projecting through said slot and over the radially outside face of the hoop to lock the ends of the ring together.

9. A spacing ring for dual wheels comprising a hoop containing a radial flange, the hoop and flange being cut radially to split them, there being a slot in the edge of the hoop adjacent one of its ends, a latch on the hoop adjacent its other end on the radially inside face of the hoop, and a tongue on said latch forming with the end of the latch a U-shaped portion which is disposed in said slot and on the radially inside and outside faces of the hoop to lock the ends of the rings together.

10. A split spacing ring for dual wheels comprising a cylindrical portion having a radial flange, the cylindrical portion and flange being cut radially to split them, there being a slot in the edge of the cylindrical portion adjacent one of its ends, and a latch on the cylindrical portion adjacent its other end, said latch having a radially extending tongue disposed endwise in said slot and having a portion overlying one side of the spacing ring to lock the ends of the ring together to thereby enable it to resist radial thrust.

11. In a dual wheel having spokes tire carrying rims attached directly to the ends of the spokes, split spacing rings engaging said spoke ends and the rims to locate the latter with respect to the plane of the wheel, clamping lugs fitted between the ends of said spokes and said rims, said lugs having wedge surfaces engaging gutters on the rims, a bolt passing through the spoke ends and lugs to move the lugs transversely of the wheel to thereby clamp the rims against the spacing rings, and tangs on said lugs engageable with said rings to limit the transverse movement of the lugs.

12. In a dual wheel having spokes, tire carrying rims attached directly to the ends of the spokes, spacing rings engaging said spoke ends and the rims to locate the latter with respect to the plane of the wheel, clamping lugs fitted between the ends of said spokes and said rims, said lugs having wedge surfaces engaging gutters on the rims and radially inwardly projecting apertured shanks, a bolt passing through the spoke ends and shanks to move the lugs transversely of the wheel to thereby clamp the rims against the spacing ring, and tangs on said lugs projecting inwardly from the shanks toward the plane of the wheel and engageable with said rings to center the rims on the wheel by limiting the transverse movement of the lugs.

13. In a dual wheel having spokes, tire carrying rims attached directly to the ends of the spokes, spacing rings engaging said spoke ends and the rims to locate the latter with respect to the plane of the wheel, clamping lugs fitted between the ends of said spokes and said rims, said lugs having wedge surfaces engaging gutters on the rims and radially inwardly projecting apertured shanks, a bolt passing through the spoke ends and shanks to move the lugs transversely of the wheel to thereby clamp the rims against the spacing ring, tangs on said lugs projecting inwardly from the shanks toward the plane of the wheel and engageable with said rings to limit the transverse movement of the lugs, and reinforcing vanes connecting said tangs with said shanks at the lateral edges of the aperture therein to thereby strengthen the lugs.

14. In a dual wheel having spokes, tire carrying rims attached directly to the ends of the spokes, split spacing rings engaging said spoke ends and the rims to locate the latter with respect to the plane of the wheel, clamping lugs fitted between the ends of said spokes and said rims, said lugs having wedge surfaces engaging gutters on the rims and apertured bolting shanks projecting radially inwardly from the lugs, a bolt passing through the spoke ends and shanks to move the lugs transversely of the wheel to thereby clamp the rims against the spacing ring, said shanks being disposed adjacent the narrow edge of the wedge portion of the lugs, tangs on said lugs also disposed adjacent said narrow edge and engageable with said rings to limit the transverse movement of the lugs, and reinforcing vanes connecting the tangs, shanks and narrow edge of each of said lugs.

15. A wheel body comprising a hub section with radiating spokes of hollow cross section, the radially outer end of each of said spokes terminating in lug receiving seats spaced apart from one another and on opposite sides of the central plane of the wheel body, a central wall joining opposite portions of said spoke end, cylindrical wall means disposed transversely of the spoke and cooperating with said central wall and the end of each spoke to form a shank receiving recess disposed on one side of said central plane and adjacent to and radially inwardly of the lug receiving seats on that side, and a second transverse cylindrical wall means disposed on the other side of said central plane and cooperating with the portion of the spoke end on said other side to form a second shank receiving recess positioned adjacent to and radially inwardly of the lug receiving seats on that side.

16. A clamping lug comprising an arcuate wedge member having opposite surfaces converging toward a narrow edge, a bolting shank projecting from one of said surfaces and disposed adjacent said narrow edge, a recess formed in the edge of said wedge member opposite said narrow edge, tang means projecting from said narrow edge on opposite sides of said recess and substantially at right angles to said bolting shank, and reinforcing fins also on opposite sides of said recess and joining said tangs, narrow edge and bolting shank.

17. A dual wheel comprising a wheel body having a hub and radiating spokes, abutments formed on the ends of said spokes and disposed substantially in the central plane of the wheel body, spacing rings mounted on the ends of said spokes one on each side of said abutments, means at the end of each spoke forming a pair of lug receiving seats on each side of the central plane of the wheel with a radially inwardly extending recess therebetween, clamping lugs mounted on and movable bodily along said seats toward each other and having radially inwardly extending bolting shanks near their narrow edges disposed for bodily movement in but out of contact with the walls of said recesses, whereby said lugs are capable of bodily movement along said seats, said bolting shanks being disposed laterally inwardly of the laterally outer points of contact between said lugs and said seats, and tire carrying rims having portions clamped between said lugs and said spacing rings.

18. In a vehicle wheel including a wheel body including a part which is fixed against lateral movement in at least one direction and a rim on the wheel body, a clamping lug for holding the rim on the wheel body comprising an elongated body member having an angular clamping portion adapted to be wedged between the rim and the wheel body and an extended tang thereon adjacent the narrow edge of said clamping portion cooperating with said laterally fixed part of the wheel body to limit the lateral inward movement of the angular portion.

19. In combination with a dual rimmed wheel having a hub and spokes radiating therefrom, spacing rings comprising hoops having the body portion thereof disposed closely against the radially outer ends of said spokes and provided with flanged marginal portions, ledge means formed on the spoke ends, rims mounted on the wheel and abutting the marginal portions of said rings, clamping lugs adapted to be moved together by means of bolts to wedge the rims of said rings against the flanged portion of said rings and to force the rings against said ledge means, and tangs on said lugs engageable with the flanged margins of said rings to prevent unequal tightening of the rims on the spokes.

20. In a dual rimmed wheel, a wheel body comprising a hub section having spokes radiating therefrom, the ends of each of said spokes being flared in the direction of the plane of the wheel to thereby form a socket extending transversely of the spoke and having parallel walls, a radial wall disposed transversely of said socket and located in the median plane of the spoke to divide the socket into inboard and outboard sections, said wall having an opening to receive a through bolt, clamping lugs having wedge portions adapted to seat on the radially outer edges of said parallel walls, and apertured shanks projecting radially inwardly from the thin edges of said wedge portions and disposed in said sockets and clearing the walls thereof, and a through bolt disposed in said opening and the apertures in said shanks.

21. In a vehicle wheel, a wheel body having a spacing ring and a rim thereon, a clamping lug for holding the rim against the spacing ring on the wheel body and comprising an elongated body member having an angular clamping portion adapted to be wedged between the rim and the wheel body and an extended tang thereon cooperating with said spacing ring on the wheel body to limit the lateral inward movement of the angular clamping portion of the lug.

22: A clamping lug comprising an arcuate wedge having a relatively thin edge at one side and a relatively thick edge at the other, said lug having laterally extending seating portions, a shank projecting from said lug and disposed between said seating portions, said shank having an opening therein adapted to receive bolt means for applying a clamping force to the lug, and a motion limiting projection disposed adjacent one edge of the lug.

23. In a vehicle wheel of the class described, a wheel body having relatively fixed abutment means thereon, and outwardly facing shoulders, forming pairs of lug receiving seats, a rim adapted to be mounted on the wheel body against said abutment means and limited in its lateral movement by its abutting engagement therewith, a clamping lug mounted on and movable bodily along each pair of seats, said lug having a wedge shaped portion, adapted to be wedged between the rim and said seats and reacting against the latter and the rim to secure the rim on the wheel, and a radially inwardly extending bolting shank near its narrow edge disposed for bodily movement between the shoulders forming said seats, bolt means received by said shank and disposed between the associated pair of shoulders, and adapted when tightened to shift said lug along said seats, and stop means to definitely limit the lateral movement of said clamping lug, but providing for rocking of the latter about its points of engagement with the laterally outer portions of said seats, against the chording resistance of the rim, upon any further tightening of said bolt means.

24. In combination with a wheel body having free spokes, the ends of which are adapted to mount a tire rim, of a tire rim having a bead, stop means on the spoke ends for limiting the axial position of the tire rim, each spoke end having spaced shoulders with room between them for receiving the ear of a bolting lug, a wedge shaped rim supporting lug having a relatively thin front or entering edge and a relatively thick rear or trailing edge and having a stop to limit axial advance, said lug having a bolt receiving ear projecting radially inward from the front portion of the lug, said ear being disposed in the space between said shoulders, and a bolt passing through said ear and serving to drive the lug axially by motion of translation between said shoulders and said bead to expand the rim until the stop limits further motion of translation of the lug, further tightening of the bolt after the forward travel of the lug is stopped tending to produce angular motion of the lug about its rear edge and to lift the forward portion of the lug and further expand the rim.

25. In combination with a wheel body having free spoke ends for supporting a tire rim, a tire rim having a bead on its inner periphery, one side of said bead being inclined at a relatively acute angle to the axis of the rim, each spoke end having a pair of seats spaced apart circumferentially and providing a pocket between the seats, a clamping lug fitting the inclined side of the bead and resting on both of said seats and having an ear extending radially into the pocket from the forward portion of the lug, a stop for limiting the axial travel of the lug and a bolt for the lug, said lug having an opening through the ear for loosely receiving the bolt, the movement of translation of the lug axially wedging the lug between the seats and the bead until the lug engages the stop, further tightening of the lug after it engages the stop tending to swing the lug about its rear edge where it rests upon the seats and thereby further expanding the rim.

26. In a dual wheel and in combination, a hub, spokes radially projecting therefrom, a laterally extending abutment formed on each spoke end, clamp seats formed on each side of said abutments, said seats being less in diameter with respect to said wheel axis than the outside diameter of said abutments, cylindrical wall means forming with said seats U-shaped shank-receiving sockets, rims having beveled clamping seats formed at one edge thereof, the inside diameter of said beveled seats being sufficiently larger than the outside diameter of said abutments to slide freely thereover, rim alining means at the inside edge of the beveled seats engaging opposite ends of said abutments, removable clamps secured for axial movement on the clamp seats against the beveled seats on said rims, one of said cylindrical wall means extending axially inwardly intermediate the ends of said abutments and terminating in an apertured radially outwardly extending wall, and clamping bolt means supported in said apertured wall and engaging said clamps.

27. In a wheel and rim structure, a wheel body including a hub, spokes radially projecting therefrom, an abutment formed at each spoke end, opposed pairs of clamp seats on opposite sides of said abutments, cylindrical wall means forming with each pair of clamp seats an outwardly directed U-shaped shank-receiving socket, one of said wall means terminating in a radial transverse wall extending inwardly of said abutments intermediate said pairs of clamp seats and having an opening therethrough extending axially of said wheel body, a clamping bolt extending through said opening and axially of said sockets, and clamping lugs having depending shanks engaging said bolt, said lugs being guided axially along said seats for clamping a pair of tire rims to said wheel body.

28. A spoke end for a wheel body of the class described comprising a radially extending transverse wall disposed in a plane passing substantially centrally through said body normal to the axis thereof, radially opening U-shaped sockets having axially extending clamp seats formed at the open sides of said sockets, one of said spokes comprising cylindrical wall means extending normal to said wall and abutment means disposed intermediate said sockets and radially outwardly of said wall on opposite sides thereof.

29. Means for mounting an edge-mounted tire rim on the spoke end of a wheel body, said spoke end having an outwardly directed U-shaped socket, comprising a clamping lug having an outer surface in the form of a section of a cone receiving said rim and an inner surface in the form of a section of a cylinder, whereby one edge of said lug is thinner than the other edge, said surfaces terminating laterally of said lug to form seating sections engaging the parallel defining edges of said socket, a bolting shank projecting inwardly from said cylindrical surface into said socket between said seating sections, and a bolt extending axially of said socket through said shank.

30. Means for mounting an internally beveled tire rim on the spoke end of a wheel body, said spoke end having an outwardly directed U-shaped socket, comprising a clamping bolt extending axially of said socket, a clamping lug comprising an arcuate wedge member having one surface in the form of a section of a cone engaging the internal beveled surface of said rim, and the other surface in the form of a section of a cylinder whereby one edge of said lug is thinner than the other edge, said lug terminating laterally of said lug to form spaced seating sections, said cylindrical surface portions of said seating sections engaging the spaced parallel defining edges of said socket, and an apertured bolting shank projecting from said cylindrical surface into said socket between said seating sections and lying in a plane intermediate the edges of said lugs, said bolt projecting through said shank and having means thereon engaging said shank for moving said lug axially inwardly of said spoke end.

31. A clamping lug of the class described comprising an arcuate wedge member having one surface in the form of a section of a cone and the other surface in the form of a section of a cylinder, whereby one edge of the wedge member is thinner than the other edge, a shank extending from said cylindrical surface intermediate said edges, said member terminating in parallel spaced seating surfaces laterally of the lug on opposite sides of said shank.

32. A clamping lug comprising an arcuate wedge member having its radial outer surface in the form of a section of a cone and having its radial inner surface in the form of a section of a cylinder, one edge of said lug being thinner than the other edge and increasing substantially uniformly in thickness from said thin edge to the thick edge thereof, said surfaces terminating laterally of the lug to form a pair of seating sections, and a shank projecting radially inwardly from said cylindrical surface between said seating sections and lying in a plane intermediate said edges.

33. A clamping lug comprising an arcuate wedge member having its radial outer surface in the form of a section of a cone and having its radial inner surface in the form of a section of a cylinder, one edge of said lug being thinner than the other edge, said surfaces terminating laterally of the lug to form a pair of wedge shaped seating sections, a shank projecting from said cylindrical surface between said seating sections intermediate said edges, and an arcuate recess in the thick edge of the wedge adjacent said shank.

34. A wheel body comprising a hub section with radially extending hollow spokes, the radial outer end of each of said spokes terminating in axially extending pairs of lug-receiving seats disposed on opposite sides of the central plane of the wheel body, outwardly directed cylindrical wall means disposed transversely of the spoke and cooperating with said pairs of seats to form shank-receiving recesses, a central transverse wall between said pairs of seats, and radially outwardly extending shoulders disposed on said seats on opposite sides of said central wall, said recesses extending axially outwardly from said central wall beyond said shoulders.

35. A wheel body comprising a hub section having radially extending hollow spokes, the radial outer end of each of said spokes terminating in axially extending pairs of lug-receiving seats disposed on opposite sides of the center plane of said wheel body, cylindrical wall means disposed transversely of said spoke and cooperating with one pair of said seats to form an outwardly directed U-shaped shank-receiving socket, said other pair of seats having radially inwardly extending wall means cooperating with said other pair of seats to form a shank-receiving recess, said cylindrical wall means terminating externally inwardly of said spoke end in a radially outwardly extending transverse wall apertured to receive a clamping bolt extending through said socket and recess, said wall extending radially outwardly beyond said seats.

36. A wheel body comprising a hub section having radially extending hollow spokes, the radial outer end of each of said spokes terminating in axially extending pairs of lug-receiving seats disposed on opposite sides of the center plane of said wheel body, cylindrical wall means disposed transversely of said spoke and cooperating with one pair of said seats to form an outwardly directed U-shaped shank-receiving socket, means extending transversely of said spoke and cooperating with the other of said pair of seats to form an outwardly directed shank-receiving recess, said cylindrical wall means terminating inwardly of said spoke end in a radially outwardly extending transverse wall apertured to receive a clamping bolt extending through said sockets, said wall extending radially outwardly beyond said seats, and radially projecting shoulder means between each of said pairs of seats and said wall.

37. In a wheel of the class described, a wheel body comprising a hub portion having radially extending hollow spokes, one lateral wall of each of said spokes at the radial outer end thereof being projected axially inwardly to form a transverse outwardly directed U-shaped socket, the axial inner end of said socket terminating in a normally extending transverse wall apertured to receive a clamping bolt, and axially extending parallel ledges terminating the socket and extending from said transverse wall outwardly beyond the lateral wall of said spoke, said ledges having a radially extending shoulder intermediate the ends thereof.

FREDERICK W. BURGER.

CERTIFICATE OF CORRECTION.

Reissue No. 19,885. March 10, 1936.

FREDERICK W. BURGER.

It is hereby certified that error appears in the printed specification of the above numbered patent requiring correction as follows: Page 6, second column, line 19, claim 28, for "spokes" read sockets; and line 56, claim 30, for "lugs" read lug; and that the said Letters Patent should be read with these corrections therein that the same may conform to the record of the case in the Patent Office.

Signed and sealed this 14th day of April, A. D. 1936.

Leslie Frazer (Seal) Acting Commissioner of Patents.